United States Patent [19]

Constant

[11] Patent Number: 4,920,313
[45] Date of Patent: Apr. 24, 1990

[54] GRAVITATIONAL MASS DETECTOR

[76] Inventor: James N. Constant, 1603 Danbury Dr., Claremont, Calif. 91711

[21] Appl. No.: 700,871

[22] Filed: Feb. 11, 1985

Related U.S. Application Data

[63] Continuation-in-part of Ser. No. 2,995, Jan. 11, 1979, abandoned.

[51] Int. Cl.$^5$ .......................... G01V 3/00; G01M 1/12
[52] U.S. Cl. .................................. 324/301; 73/382 G
[58] Field of Search ............... 324/300, 301, 302, 326, 324/345; 73/382 R, 382 G

[56] References Cited

U.S. PATENT DOCUMENTS

| | | | |
|---|---|---|---|
| 3,324,385 | 6/1967 | Hings .................................. | 324/345 |
| 3,722,288 | 3/1973 | Weber ............................... | 73/382 G |
| 3,786,340 | 1/1974 | Otten et al. .......................... | 324/301 |
| 3,808,519 | 4/1974 | Lemercier et al. .................. | 324/326 |

*Primary Examiner*—Thomas H. Tarcza
*Assistant Examiner*—Gregory C. Issing
*Attorney, Agent, or Firm*—Harris, Kern, Wallen & Tinsley

[57] ABSTRACT

A system which detects the presence and bearing of a mass M implemented by having a first field or wave interact with the motion of a charged mass m to produce a second field or wave which is modulated by the tidal effect of mass M. The second field or wave with unique tidal signal is then detected. The system can be implemented as a magnetic resonance spectrometer, gyrotron, cyclotron, Fourier Transform-Mass Spectrometer (FT-MS), or even as a large spinning mass and permits the substantial increase in the sensitivity of practical gravitational mass detectors and gradiometers and thereby permitting the detection of earthbound objects such as ore deposits, ships, submarines, tanks, artillery, and small concealed handguns and may extend gravitational mass detection capabilities to space and galactic objects.

65 Claims, 2 Drawing Sheets

GRAVITATIONAL MASS DETECTOR

BACKGROUND OF THE INVENTION

The present invention relates to gravitational mass detectors suitable for locating the presence and direction of a mass. More specifically, the invention relates to mass detection systems and gradiometers which detect the presence and effects produced by the tidal field of a mass M acting on the path or orbit of another mass m provided by the instrument. The instrument mass m may be in the form of a solid mass or wave energy. This disclosure is a continuation-in-part of my application Ser. No. 002,995 filed Jan. 11, 1979 now abandoned based on my Disclosure Document 072762 filed Jul. 19, 1978.

The extreme weakness of gravitational interaction with matter requires a very high sensitivity for detection. This is best accomplished by using high-Q transducers and amplification of weak signals. While this fact is generally recognized, few practical devices exist having high resonance and power gains.

In the prior art, the detection of a gravitational field has been accomplished by detecting tidal forces, torques and pressures and, in one instance, wavelength changes produced by the tidal fields. There are several prior art approaches for measuring tidal forces locally, i.e., by a small instrument. Devices which have been used to measure tidal effects include the rigid rod in free fall, the gradient balance (Eotvos) and the gravity gradiometer (Forward). Fields of $10^{-2}$ Eotvos Unit have been detected by the Eotvos balance and fields of 1 Eotvos Unit have been detected by a prototype of the Forward gradiometer. 1 EU (Eotvos Unit) is defined as $10^{-9}$ gal/cm where a gal (Galileo) is 1 cm/sec$^2$. The beam of the Eotvos balance was 0.4 m long while the Forward gradiometer is only 0.15 m in diameter. A reduction in size of both devices is possible in principle, although the sensitivity of the Eotvos device is dependent while that of the Forward device is independent of the size of the apparatus. This can all be seen in the book by H. Ohanian "Gravitation and Spacetime" W. W. Norton and Co., Inc. N.Y. 1976. Another device, the neutron interferometer, has been reported in the paper by R. Colella and A. Overhauser "Observation of Gravitationally Induced Quantum Interference" appearing in the Jun. 9, 1975 issue of Physical Review Letters. This device senses the difference in the phase of the neutron de Broglie waves in the two beams of the interferometer when the plane of the beams is vertical, i.e., where the earth's gravitational gradient exists. Its scientific significance is that it connects gravitational and quantum mechanical phenomena for the first time. It has been employed to detect the difference in the earth's gravitational potential over a vertical distance (separation of beams) of less than an inch (2.54 cm). At best, however, it is believed that the sensitivity of the Colella device is no greater than that of the Eotvos and Forward systems. The foregoing devices are fixed base.

There are three moving base gravity gradiometers currently under development at the Hughes Research Laboratories, the Bell Aerospace Corporation, and the Charles Stark Draper Laboratories. These instruments have been reported in the publications by C. Ames et al., "Prototype Moving Base Gravity Gradiometer" R&D Design Evaluation Report, Hughes Research Labs, Malibu, Calif., Jan. 1973, by E. Metzger and A. Jircitano "Analysis of Real Time Mapping of Horizontal and Vertical Gravity Anomalies Aboard A Moving Vehicle Such as an Aircraft" International Symposium on Application of Marine Geodesy, Columbus, Ohio, Jun. 1974, by M. Trageser "A Gradiometer System for Gravity Anomaly Surveying" from "Advances in Dynamic Gravimetry" Proc. of the Symposium on Dynamic Gravimetry, (T. Kattner, editor), Fort Worth, Tex, Mar. 1970, and by M. Trageser "Feasibility Model Gravity Gradiometer Test Results" ALAA Guidance and Control Conference, Boston, Mass., Aug. 1975, Paper No. 75-1093. The design for each of these sensors is 1 EU. The group includes sensors designed specifically to measure the gravity gradient, as well as sensors which utilize existing accelerometers to provide a gradient estimate. The Hughes and Bell instruments rotate, modulating the information. This rotation transfers the gravity gradient to a higher frequency, quieter portion of the spectrum, and can separate the signal from some sources of instrument bias. The Draper Lab sensor measures the gradient signal at zero frequency and uses a sophisticated flotation system to isolate the sensing element from errors induced by rotation and jitter.

In addition, a very sensitive superconducting accelerometer has been reported in the article by H. Paik "Superconducting tunable-diaphragm transducer for sensitive acceleration measurements" appearing in the Mar. 1976 issue of the Journal of Applied Physics. The expected sensitivity of this sensor is better than 0.1 EU. Suggested devices which utilize high-Q torque balances, high-Q dielectric crystals, and high-Q toroidal microwave cavities as detectors have been reported in the article by V. Braginsky "Laboratory experiments to test relativistic gravity" appearing in the Apr. 15, 1977, issue of the Physical Review. The feature of these devices is the extremely high Q approaching on the order of $10^9$–$10^{11}$ and thereby contrasting the present developmental devices whose Q is on the order of $10^2$.

To gain some perspective, the magnitude of the earth's field at the distance of its radius is $1.53 \times 10^3$ EU and the field of a 10,000 ton submarine at a distance of 10 km is $6.67 \times 10^{-7}$ EU and the field of a 1 kgm object at the distance of 1 m is $6.67 \times 10^{-2}$ EU. Thus, while the prior art devices have the sensitivity to detect the presence of the earth they fall short of having the sensitivity to detect many other objects. It is the general purpose of the invention to provide practical gravitational mass detectors having sensitivities which greatly exceed, by many orders of magnitude, the sensitivities of prior art devices. The use of such a device will extend the detectability of concealed handguns at airports, the detection of tanks, artillery, ore deposits, ships, etc., at the earth's surface, and the detection of objects in the sky and perhaps even the detection of very large and massive objects in and beyond the solar system.

The system of the invention uses novel apparatus and method to detect the tidal field of a gravitational mass M. Briefly, the tidal field of M interacts with the motion of an instrument mass m characterized by a Larmor or cyclotron frequency. The interaction modulates or modifies the motion frequency and this effect is used to detect the presence and direction of mass M. To obtain its sensitivity, the invention system prefers the use of high-Q mass resonators, power amplifiers, receiver cooling, and signal processors to increase the total gain of weak gravitational signals and thereby permitting the substantial increase of sensitivity over existing devices. For example, it is expected that the system of the invention will provide a total gain which exceeds 200 dB in the submarine application.

It is the purpose therefore of the present invention to produce a highly sensitive, small size and weight, low power consumption and low cost gravitational mass detector for use in detecting masses such as ore deposits, bridges, ships, concealed mines, and handguns, etc.

SUMMARY OF THE INVENTION

This invention provides both apparatus and method for the implementation of highly sensitive gravitational mass detecting systems for detecting weak gravitational fields.

The general purpose of this invention is to provide highly sensitive, small size and weight, low power consumption and low cost systems which can be used to implement gravitational mass detectors in such diverse applications as large airborne, satellite borne and shipborne detectors for locating ore concentrations, ships, submarines and ground vehicles, and small portable detectors used by agencies and individuals for locating small metallic objects and handguns. Utilizing the system of the present invention, extremely high resonance amplification and processing gains are obtained for detecting signals produced by weak gravitational fields which otherwise would be lost and, therefore, practical small and efficient size equipment becomes available for gravitational mass detection applications which otherwise cannot be made.

In accordance with a feature of this invention an apparatus for detecting a weak gravitational field using a magnetic resonance spectrometer is provided. The apparatus may comprise a strong magnet, a probe having transmit and receive coils, a transmitter connected to the transmit coil which supplies a weak magnetic field, a sample or plasma (solid or liquid) of bound or unbound mass (electrons, protons, ions, etc.), and a receiver connected to the receive coil which detects the resulting magnetic field at the magnetically resonating frequency of the sample or plasma.

In accordance with another feature of this invention an apparatus for detecting a weak gravitational field using a gyrotron is provided. The apparatus may comprise a strong magnet, a waveguide probe having transmit and receive sidewall couplings, a source which supplies bound or unbound mass (electrons, protons, ions, etc.) in a beam to the waveguide probe, a transmitter connected to the transmit coupling which supplies a weak electromagnetic field to the waveguide probe, and a receiver connected to the receive coupling which detects the amplified electromagnetic field at the resonating frequency of the beam.

In accordance with another feature of this invention an apparatus for detecting a weak gravitational field using an ion spectrometer is provided. The apparatus may comprise a strong magnet for containing ions, a probe having transmit and receive capacitors, a transmitter connected to the transmit capacitor which supplies a transmitting field, a sample or plasma (solid or liquid) of bound or unbound mass (electrons, protons, ions, etc.) and a receiver connected to the receive capacitor which detects the transmit or its own field at the resonating frequency of the sample or plasma.

In accordance with another feature of this invention a modulator may be provided to modulate the transmitter.

In accordance with another feature of this invention a signal processor may be provided to process signals from the receiver.

In accordance with another feature of this invention a directional finder may be provided to determine the angular direction of the gravitational field.

In accordance with yet another feature of this invention a scope or recorder may be provided to view and record events.

It will be appreciated from the foregoing that the apparatus is uncomplicated and comprises one of a conventional magnetically resonating spectrometer, gyrotron, ion spectrometer or the like which receives input from a magnetic, electric, or electromagnetic transmitter and may provide an output which can be used as input to a magnetic, electric, or electromagnetic receiver. The detected mass M produces a unique tidal field and signal in the receiver whose output can subsequently be detected in a filter, integrator or correlator and then viewed on a scope or recorder.

In accordance with another feature of the invention a method for detecting a weak gravitational field in a magnetic resonance spectrometer is provided. The method comprises the steps of inputting a weak field or wave into the spectrometer and detecting the magnetic field or wave from the spectrometer at the magnetically resonating frequency of the sample or plasma being used.

In accordance with another feature of the invention a method for detecting a weak gravitational field in a gyrotron tube is provided. The method comprises the steps of inputting a weak electromagnetic wave into the gyrotron and detecting the electromagnetic wave from the gyrotron at the resonating frequency or as a sideband of the resonating frequency of the gyrotron.

In accordance with another feature of the invention a method for detecting a weak gravitational field in an ion spectrometer is provided. The method comprises the steps of inputting a weak magnetic, electric, or electromagnetic field into the ion spectrometer and detecting a magnetic, electric, or electromagnetic field from the ion spectrometer at the resonant frequency of the sample or plasma in the ion spectrometer.

In accordance with another feature of this invention the method also includes the step of modulating the transmitted field or wave.

In accordance with another feature of this invention the method includes the step of processing signals from the spectrometer or gyrotron.

In accordance with another feature of this invention the method also includes the step of finding the angular direction of a gravitational source.

In accordance with yet another feature of the invention the method includes the viewing and recording of events.

It will be appreciated from the foregoing that the method is equally simple and comprises the steps of inputting a magnetic, electric, or electromagnetic field into a spectrometer or gyrotron and detecting a magnetic, electric, or electromagnetic field from the spectrometer or gyrotron at its resonating or harmonic frequency. The method may also include one or more of the steps of modulating the transmitted and received fields, processing detected signals, finding the direction of the gravitational source, viewing and recording events. The detected mass M produces a unique tidal field and signal in the spectrometer or gyrotron device.

DESCRIPTION OF THE PREFERRED EMBODIMENTS

Figure 3:
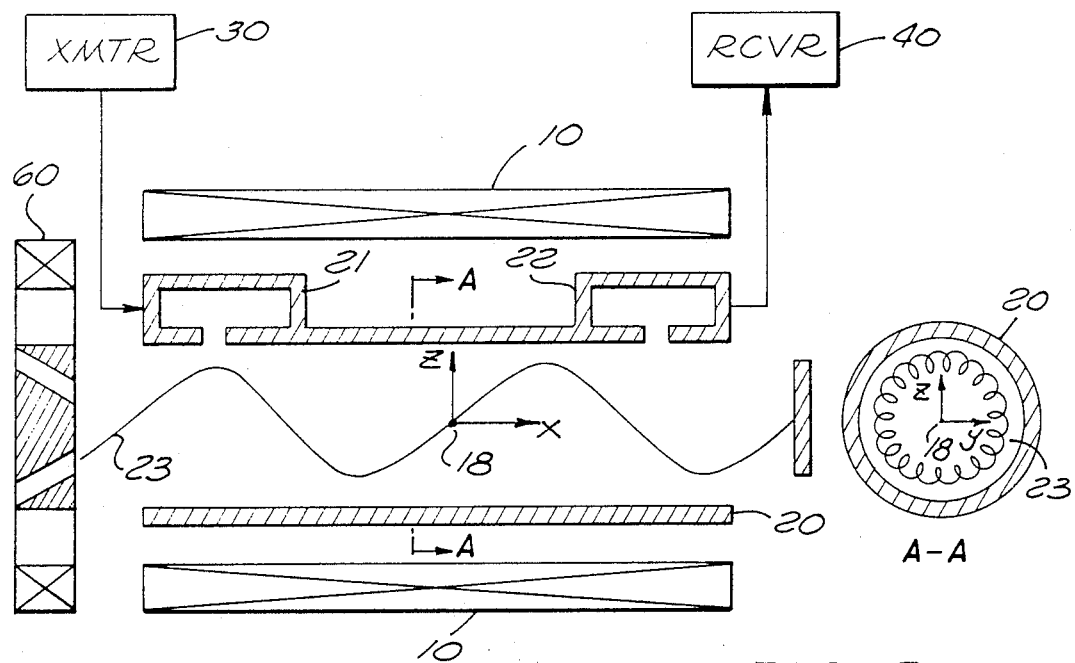
FIG. 3 is an embodiment of the invention using a gyrotron tube.
Figure 4:
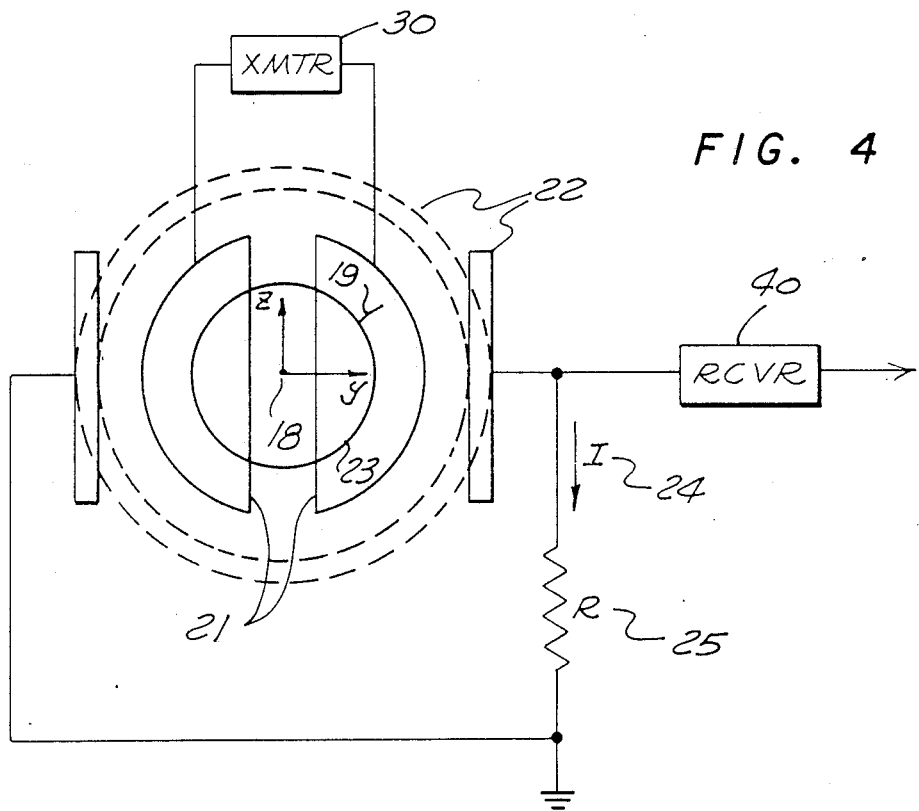
FIG. 4 is an embodiment of the invention using an ion spectrometer.

In general, the invention provides apparatus and method for detecting a weak gravitational field by detecting the motion of spinning or rotating (orbiting) bound or unbound mass (electrons, protons, ions, etc.) contained by a field such as a magnetic, electric, or electromagnetic field. The motion may be detected by a magnetic, electric, or electromagnetic means (receiver). The field detected by the receiver may be its own field or a field provided by a separate magnetic, electric, or electromagnetic means (transmitter). In other words the invention operates as a passive receiver (without transmitter) or as an active receiver (with transmitter). For example, in FIG. 2 the detecting means is a coil 22 which detects a magnetic field supplied by a transmitting coil 21. In FIG. 3 the detecting means is an LC (coil-capacitor) circuit 22 which detects an electromagnetic field supplied by a transmitting LC (coil-capacitor) circuit 21. In FIG. 4 the detecting means is a capacitor C or coil L 22 which detects an electric or magnetic field supplied by a capacitor C or coil 21. Elements 21 and 22 in FIGS. 2–4 may be separate elements as shown or may be the same element.

Prior to describing the invention, a brief description of the physical principles of the invention is set forth. Any motion of a charged body has an associated magnetic field; on a macroscopic scale an electrical current, which is due to the motion of electrons along a conductor, produces a magnetic field. Current in a loop has an associated magnetic dipole moment. This phenomenon also occurs on the atomic and nuclear scales, for which electrons or nuclei possess angular momentum and have a magnetic moment. Since angular momentum is quantized on these scales, so are magnetic moments.

The magnitude of such moments is most easily discussed from the classical standpoint by considering orbital electronic motion. Suppose an electron is travelling in an orbit at an angular velocity $\omega$. Such motion is equivalent to an electrical current loop in the opposite direction and having magnitude $i = e\omega/2\pi$ where e is the magnitude of the charge on the electron. The orbital angular momentum, denoted by P, is $I\omega$ where $I = m_e r^2$ is the moment of inertia, $m_e$ is the mass of the electron and r is its distance from the nucleus or orbital center. Thus, the current is $$i = \frac{e\omega}{2\pi} = \frac{eP}{2\pi m_e r^2} \quad (1)$$

The magnetic moment $\mu$ generated by such motion is given in electromagnetic theory by $\mu = A i$ where A is the area of the orbit. If it is supposed, for simplicity, that the electron moves in a circular orbit, $A = \pi r^2$, and $$\mu = A i = \frac{e}{2 m_e} P \quad (2)$$

which illustrates the fact that $\mu$ is proportional to P. Actually, for electrons, $\mu$ and P are anti-parallel vectors. As stated previously, on the atomic scale, the angular momentum is quantized in units of (Planck's constant h divided by $2\pi$). It follows that electron magnetic moments are quantized in units of $e/2m_e$. This unit is the well known Bohr magneton $\mu_B$.

When spin motion is involved it is necessary to introduce a g-factor (the Lande splitting factor). Thus, $$\mu = g \frac{e}{2 m_e} P = g \frac{\mu_B}{h} P \quad (3)$$

which is used for couples spin-orbital motions if the appropriate values of g are available (from tables). Equation (3) can be reproduced by a full quantum-mechanical treatment.

Analogous equations can be developed for the spin-orbital motions of nuclei and even for mechanical systems on the macroscopic scope. Thus, more generally, $$\mu = \gamma P \quad (4)$$

where $\gamma$ is the magnetogyric ratio $$\gamma = \frac{g \mu_o}{n}, \mu_o = \frac{q^n}{2 m} \quad (5)$$

where g is the (atomic, nuclear or mechanical) g-factor, q is the charge, and m is the mass of the orbiting and spinning body.

From the foregoing it will be appreciated that the magnetic moment $\mu$ of an orbiting and spinning body is proportional to the orbital angular momentum and, since $P = I\omega$, to the angular velocity $$\mu = \gamma I \omega \quad (6)$$

which is our final result valid on the atomic, nuclear and mechanical scales.

The general procedure of the invention is the use of the well known concept of magnetic resonance at the atomic, nuclear or mechanical scales. Thus, a magnetic moment $\mu$ will precess about an applied magnetic field $B_o$ at the precession (cyclotron) frequency $$\omega_c = \gamma B_o \quad (7)$$

where $\omega_c = 2\pi$ times the precession frequency $f_c$. Now, if there is an additional weak field $B_1$ perpendicular to $B_o$ then, this field will also exert a torque on $\mu$, tending to change the angle $\theta$ between $\mu$ and $B_o$. However, if $B_1$ is fixed in direction it will alternatively try to increase and decrease $\theta$ as $\mu$ precesses. Since $B_1$ is stated to be weak, the net effect will be a slight wobbling in the precession of $\mu$; such an effect is referred to as a nutation. Alternatively, the motion of $\mu$ can be described as caused by a resultant field $B_o + B_1$. If, on the other hand, $B_1$ is not fixed in direction but is rotating about $B_o$ with the same frequency of equation (7) as the precession of $\mu$, its orientation with respect to $\mu$ will be constant. Suppose this orientation is such that $B_1$ is always perpendicular to the plane containing $B_o$ and $\mu$; then the torque exerted on $\mu$ by $B_1$ will always be away from $B_o$. Consequently, a large effect on $\mu$ is possible. Since changing $\theta$ corresponds to changing the energy of $\mu$ in $B_o$ this condition is described as a resonance. Thus, by the above discussion, the frequency of the field $B_1$ required must equal the precession frequency of equation (7) of the magnetic moment. The energy for the change of $\mu$ is, of course, derived from the rotating field $B_1$, which may be supplied by radiofrequency electromagnetic waves or radiation.

Since at resonance angle $\theta$ increases, the magnetic vector $\mu$ flips over to a direction which provides a magnetic field component $B_2$ perpendicular to $B_o$. Thus, the resonance phenomenon can be detected by detecting vector $B_2$, for example by induction in a coil placed to receive vector $B_2$ or by absorption of energy in the coil which provides vector $B_1$.

The general procedure of the invention is similar for observing the spinning or orbiting motion of a mass as it is for observing the motion of its precessing magnetic moment $\mu$. In either case, the basic equations are $$\omega_c = \frac{2\pi}{t_c} = \frac{v}{r} \tag{8}$$

where $v$ = speed of orbiting mass $r$ = radius of orbiting mass $t_c$ = orbital period In equation (8), it will be appreciated each term is a constant by virtue of equation (7). This means that while the orbital frequency $f_c$ and period $t_c$ are constants, the orbital radius $r$ increases with speed $v$ if energy is supplied to the orbiting mass. As will become apparent during the remaining part of this disclosure, the system of the invention may observe the spinning or orbiting mass itself or its precessing magnetic moment $\mu$.

Figure 1:
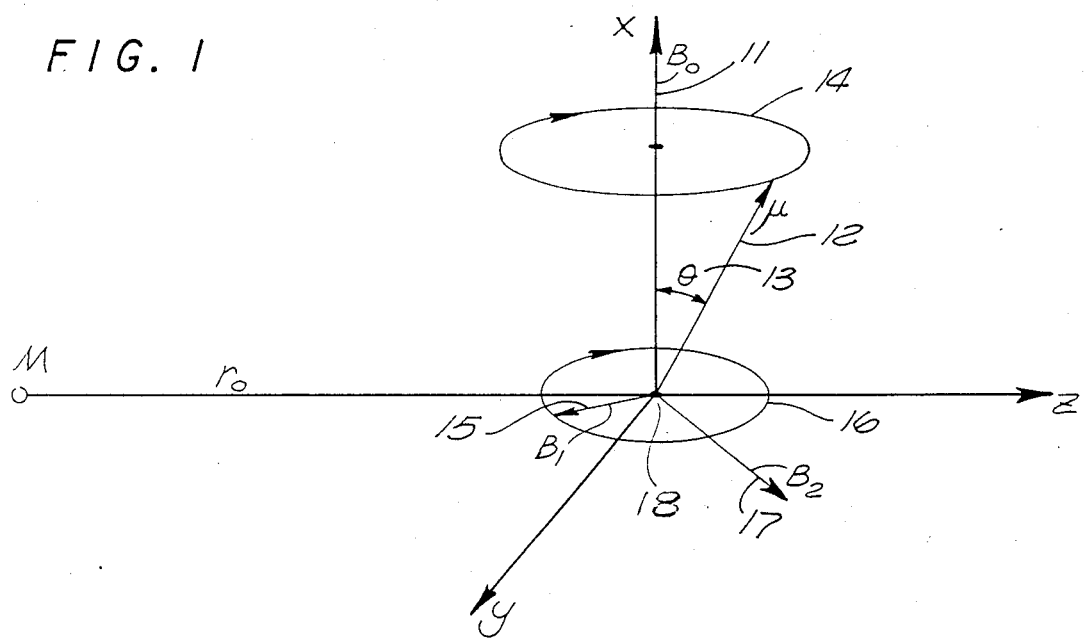
FIG. 1 illustrates the precession of the magnetic moment vector $\mu$ and the rotation of a weak magnetic field $B_1$ in the presence of a strong magnetic field $B_o$ where $\mu$ and $B_1$ interact to produce a weak magnetic field $B_2$. Magnetic fields $B_o$, $B_1$, and $B_2$ may be parts of electromagnetic fields.

FIG. 1 illustrates the effect of a rotating magnetic field on a precessing magnetic moment $\mu$. First, the magnetic vector $B_o 11$ combines with the magnetic moment $\mu 12$ of a body orbiting at the angular velocity $\omega$. Vectors $\mu$ and $B_o$ are separated by the angle $\theta 13$ and this produces precession of the magnetic moment $\mu 12$ at the frequency $\omega_c$ given by (7). The magnetic moment $\mu 12$ precesses in the circle 14 at frequency $\omega_c$. Next, independent magnetic field $B_1 15$ rotates in circle 16. Resonance is obtained when vectors $\mu 12$ and $B_1 15$ are rotating at the same rate, i.e., at the frequency $\omega_c$. At resonance, angle $\theta 13$ increases and magnetic vector $\mu 12$ provides a vector component $B_2 17$ perpendicular to $B_o 11$.

It should be noted that vector $B_2 17$ represents energy from vector $B_1 15$ used to flip magnetic vector $\mu 12$. In other words there is no amplification between signals $B_1 15$ and $B_2 17$ but only resonance occurs. This forms the basis of the modern magnetic resonance spectrometer and will be used to implement the invention system in FIG. 2. In contrast, the gyrotron will be used to implement the system in FIG. 3. The gyrotron works on a slightly different principle from that discussed in FIG. 1 but, significantly, provides amplification between input and output signals. An ion spectrometer will be used to implement the invention system in FIG. 4. The ion spectrometer employs magnetic or electric fields rather than magnetic and electromagnetic fields used in the systems of FIGS. 2 and 3.

In FIG. 1, mass m orbits in a circle (not shown) in a plane normal to magnetic moment $\mu 12$ at point 18. A mass M is shown located at a distance $r_o$ along the negative z-axis of an orthogonal x, y, z coordinate system. We next consider how the presence of mass M affects the orbit of mass m.

The tidal forces of mass M on orbiting mass m are given by $$f_y = -myK, \; f_z = 2mzK$$

$$K = \frac{GM}{r_o^3} \tag{9}$$

in which G is the gravitational constant. Equations (9) are valid when the distance $r = (y^2 + z^2)^{\frac{1}{2}}$ is much smaller than the distance $r_o$, i.e., $r < r_o$.

Equation (9) shows that the force $f_z$ is repulsive and twice the size of force $f_y$ which is a restoring force. Moreover, forces of equation (9) are proportional to distances y, z respectively. These forces are superimposed on the radial force $\bar{f}_o$ (due to a charge or magnetic field) and, in the absence of other forces, the total force acting on orbiting mass m is given by:

$$\bar{F} = \bar{f}_o + \bar{f}, \; \bar{f} = \bar{f}_y + \bar{f}_z \tag{10}$$

in which overbars indicate vectors. Thus, force $\bar{F}$ of equation (10) is in the y-z plane and comprises the radial force $\bar{f}_o$ which holds mass m in the orbit of mass M and tidal forces $\bar{f}_y$ and $\bar{f}_z$ due to the presence of mass M.

The torque about the x-axis is given by $$T_x = 3 K I_{yz}, \; I_{yz} = -\int y z \, dm \tag{11}$$

in which $I_{yz}$ is the y-z plane moment of inertia. Since, for the present example, orbiting mass m is a small discrete mass $I_{yz} = -y z m$. The x-axis angular momentum therefore of orbiting mass m changes at the rate $$\frac{dP_x}{dt} = T_x = -3 \, Kmyz \tag{12}$$

which, since $y = r \sin \omega t$ and $z = r \cos \omega t$ is rewritten as $$\frac{dP_x}{dt} = -\frac{3}{2} K I \sin 2\omega t \tag{13}$$

in which all quantities have been previously defined. Equation (13) is the action of the tidal gravitational field of mass M on the orbit of mass m.

A discussion of tidal forces, torques, and angular momenta may be found in my book "Gravitational Action" Pioneer Press 1979 (available from RCS Associates, P.O. Box 606, Claremont, Calif. 91711). See also the cited Ohanian reference. We next show how equation (13), due to the action of gravitational torque on orbiting mass m, can be used to detect the presence of mass M.

Since $P_x = I\omega$, the rate of change of angular velocity $\omega$ in the presence of mass M becomes $$\frac{d\omega}{dt} = -\frac{3}{2} K \sin 2\omega t \tag{14}$$

which indicates that the rate of change of the angular velocity of mass m is independent of its moment of inertia I. Moreover, the change of the angular velocity is a sinusoidal function of time whose period is ½ the orbital period $t = 2\pi/\omega$. Thus, if $\omega$ is the rate in the absence of mass M then in its presence it becomes $$\omega = \omega_o \left[ \left( 1 - \frac{3K}{4\omega_o^2} \right) + \frac{3K}{4\omega_o^2} \cos 2\omega_o t \right] \tag{15}$$

which indicates a cosinusoidal frequency modulation when the external mass M is present. It will be appreciated that frequency modulation of equation (15) is a unique signal produced by the tidal forces of mass M. This signal can be easily detected provided of course its strength is available.

Equation (15) indicates a fixed rate and periodic shifts of the rate either or both of which may be detected in a receiver. Or, in view of equation (6), the amplitude modulation of the magnetic moment $\mu 12$ may be detected. Neglecting the fixed term in equation (15), the input voltage or current to a receiver may assume the form $$e = E_c \left( 1 + \frac{3K}{4\omega_o^2} \cos 2\omega_o t \right) \sin \omega_o t \tag{16}$$

in which the first term is the unmodulated input in the absence of mass M and the second term is the modulation due to the presence of mass M. The input power is obtained by squaring both sides of equation (16). The effect of the modulation in equation (16) is to produce sidebands which can then be detected. In general, the angular rate $\omega_o$ is greater than rate $\omega_c$ for bound particles while $\omega_o = \omega_c$ for unbound particles. We now turn to the practical implementation of these new systems of the invention.

Figure 2:
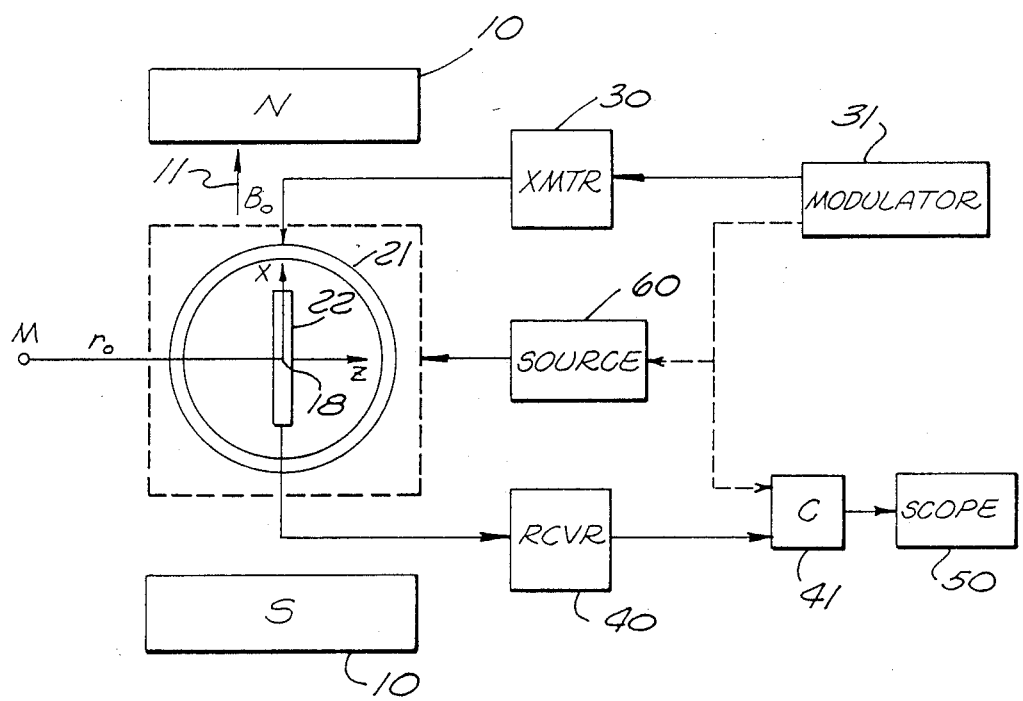
FIG. 2 is an embodiment of the invention using a magnetic resonance spectrometer.

FIG. 2 shows the block diagram of the invention system using a magnetic resonance spectrometer. The mass M being detected is located at the distance $r_o$ from the center of coordinates 18, also identified in FIG. 1. The FIG. 2 system of the invention generally employs well known principles also utilized by conventional spectrometers based on magnetic resonance, for example as discussed in the references by B. Straughan and S. Walker eds. "Spectroscopy" Vols I-III Halstead Press, John Wiley N.Y. 1976, A. Thorne "Spectrophysics" Halstead Press, John Wiley N.Y. 1974, O. Howarth "Spectroscopy" Halstead Press, John Wiley N.Y. 1973, R. Bell and R. Harris "Nuclear Magnetic Resonance Spectroscopy" Appleton-Century Crafts, Meredith Corp. N.Y. 1969, and F. Bovey "Nuclear Magnetic Resonance Spectroscopy" Academic Press 1969. Nuclear magnetic resonance (NMR) has been used successfully in medical applications, as discussed in the articles by I. Pykett, "NMR Imaging in Medicine" appearing in the May 1982 issued of Scientific American and by P. Bottomley, "NMR: beyond physical imaging: appearing in the Feb. 1983 issue of IEEE Spectrum. NMR has also been used in explosives detection applications, as discussed in the article by R. Gonano, "NMR and NQR for Bomb Detection" appearing in the Proceedings of the Electro Conference Record, Apr. 24-26, 1979.

Any one or more of the spectrometers, components and techniques suggested in the foregoing references may be utilized. However, it may be necessary to modify such spectrometers, components and techniques to detect signals, for example signals predicted by equation (16). This means that apart from changes that may be necessitated to maximize the interaction of the gravitational field of mass M and magnetic moment $\mu 12$ it may also be necessary to add filters which enable the detection of the modulation frequencies suggested of equation (16) and, in some applications, the use of a modulator of frequencies $\omega$, $\omega_c$ (or both) and a correlator or integrator of detected signals may be needed.

The basic requirements of the gravitational mass detector in FIG. 2 are:

(1) A powerful permanent or electro magnet 10, into which a probe 20 is placed. Magnet 10 may have cooling including supercooling, i.e., magnet 10 may be a superconducting magnet. Probe 20 includes a sample or plasma which may be implemented on the atomic, nuclear or mechanical scales. A net magnetization is induced in the direction of the applied magnetic induction $B_o(11)$, also identified in FIG. 1. The sample or plasma is characterized by having a magnetic moment $\mu(12)$ precessing at the frequency $\omega_c$ given by equation (7).

(2) A transmitter 30, which supplies the weak field $B_1(16)$ at the appropriate resonating frequency $\omega_c$. Magnetic field $B_1 15$ is applied perpendicular to the direction of magnetic field $B_o 11$. At resonance, magnetic field $B_1 15$ rotates at the same frequency $\omega_c$ as does the magnetic moment $\mu 12$. In some applications, it may be desired to include a modulator 31 to modulate transmitter 30, for example to amplitude modulate $E_c$ or to frequency modulate $\omega_o$, $\omega_c$ in equation (16).

(3) A receiver 40, which is arranged to detect the resonance by registering signals $B_2 17$ in the direction perpendicular to the plane of $B_o$—$B_1$. At resonance, the signal detected by receiver 40 is of the type given by equation (16). In some applications, a correlator, matched filter or equivalent circuit C 41 may be used to detect signals of equation (16). If modulator 31 is used it may be connected to correlator C 41 as shown by the dashed line in FIG. 2. The exact type of correlator C 41 will be determined by the exact form of signal of equation (16) in any case. Correlator C 41 may include, in lieu of or in addition to, an integrator or narrowband filter, for example a narrowband filter centered at the modulation frequency $\omega_c \pm 2\omega_o$. The period of observation, integration or correlation of signals (16), denoted by $T_o$, may extend over many periods of $\omega$. For example, the probability of detecting modulation signals in equation (16) in correlator or integrator C 41 is improved significantly by coherent detection over a number of periods of the angular velocity $\omega$. Or, as alternative to correlator C 41, modulator 31 may provide a replica of the modulation signal of equation (16) directly to coil 21 in which case magnetic vector $B_1 15$ and magnetic moment $\mu 12$ are spatially synchronized in amplitude, frequency, and phase and receiver 40 therefore detects magnetic vector $B_2 17$ as pre-detected spatial correlation.

(4) A scope or recorder 50, to provide a real time or permanent record of the signal being observed by receiver 40.

Depending upon the actual implementation, a search is made for resonance by:

(a) sweeping the magnetic induction in the region of $B_o11$ and keeping the frequency of $B_115$ constant; or (b) sweeping the frequency of $B_115$ in the region of the Larmor or cyclotron frequency, while keeping $B_o11$ constant; or (c) applying a pulse of high power frequency of $B_115$ for a short interval of time and (optionally) observing free induction decay. Thus, it will be appreciated that the invention system may be implemented as a continuous wave or pulse system.

Probe 20 may be of the crossed coil variety in which case it contains separate orthogonal coils, one of which acts as a transmiter coil 21 and the other as a receiver coil 22, for example the case illustrated in FIG. 2. Alternatively, probe 20 may be of the single coil variety in which case it acts as one arm of a frequency bridge (not shown). Examples of coil arrangements which may be utilized in cw and pulsed systems are shown in the cited references (FIGS. 2.7, 2.8 Straughan and Walker, FIG. 5.4 Howarth, FIGS. 1-3 Bovey, FIG. 1-20 Bell and Harris). In general, probe 20 may include a vacuum, liquid or solid medium for containing particles and may include means other than magnetic field $B_o11$ for constraining particles in probe 20. As shown in the references, probe 20 also includes means for implementing magnetic moment $\mu 12$. For example, a sample or plasma of bound electrons, protons, ions, etc. may be included in probe 20. Thus, while the sample or plasma is not shown in FIG. 2, for simplicity, it defines the magnetic moment $\mu 12$ in accordance with equation (6). It will now be obvious, therefore, to provide a variety of samples or plasmas in a probe 20 to implement magnetic moment $\mu 12$ using techniques of magnetic resonance spectroscopy.

Up to this point, magnetic moment $\mu 12$ has been defined essentially for bound particles, for example samples and plasmas used in conventional magnetic resonance spectrometers. Alternatively, magnetic vector $\mu 12$ can also be defined for unbound particles, for example a loop of unbound electrons, protons, or ions. In this case, the unbound particles can be obtained from a source 60, for example an electron, proton, or ion filament or gun. As shown in FIG. 2, particles from source 60 may be injected perpendicular to the strong magnetic field $B_o11$ and these will rotate in a plane perpendicular to this field with magnetic moment $\mu 12$ parallel to the field, i.e., having zero angular separation ($\theta = v$). Or, to obtain non-zero angular separation $\theta 13$, particles from the source 60 may be injected into the field $B_o11$ with angle $\theta$ offset from the perpendicular direction of the field $B_o11$. In this case, the particles rotate at the cyclotron frequency and move in the x-direction. Thus, the system of the invention may be implemented using bound particles essentially following a magnetic resonance spectrometer or, the system may be implemented using unbound particles which requires the addition of a source 60 to produce the beam of particles. Source 60 may provide one or more types of particles having a single or different charge-to-mass ratios. Modulator 31 may be used to modulate source 60. Thus, source 60 may be a continuous or pulsed source of the same or different types of particles.

FIG. 3 shows the block diagram of an alternative invention gravitational mass detector which utilizes the gyrotron to implement amplification and power gains. The probe 20 may be a circular waveguide with appropriate sidewall couplers 21 and 22 (corresponding to the coils 21 and 22 in FIG. 2). Source 60 may be in the form of a magnetron injection gun. In such a gyrotron or cyclotron resonance maser, a hollow tubular beam of particles such as electrons, protons, ions, etc., 23 is injected into the metal waveguide 20, with the axis of the beam coincident with the axis of the waveguide. The particles 23 follow a helical path along the waveguide 20 axis because of the magnetic field $B_o11$ (produced by solenoid 10) with lines of force parallel to the waveguide 20 axis. As the particles 23 travel along the axis of waveguide 20 they interact with the field established between couplers 21 and 22. The interaction between particles and field amplifiers the latter. In effect, magnetic moment $\mu 12$ corkscrews about the axis of waveguide 20 and also spins. The spinning is better shown in insert A—A which represents the cross-section of waveguide 20. Phase syncronism occurs between the particle orbits and the field, when the wave frequency is close to the cyclotron frequency of equation (7). Actually, energy transfer from the particles to the wave is optimized when the wave frequency is slightly higher than the particle cyclotron frequency (or its harmonics). The gyrotron principle is well known, for example as discussed in the news article "Microwave power tubes are more than just arount—they're getting better" appearing in the Apr. 26, 1978 issue of Electronic Design. Recent progress in novel techniques for generating high power in free-electron masers and cyclotron-resonance-masers is discussed in the article by P. Spangle and T. Coffey, "New sources of high-power coherent radiation" appearing in the Mar. 1984 issue of Physics Today.

As used by the invention, transmitter 30 provides energy input to the waveguide 20 through input sidewall coupler 21. The energy is amplified by interacting with the particle beam 23 and appears as an output from waveguide 20 through output sidewall coupler 22. The output from coupler 22 is made available as input to receiver 40. If mass M is present, the signal which appears as input to receiver 40 will be of the type given by equations (15) and (16). Transmitter 30 may include an AM, FM, or PM modulator 31 and receiver 40 may include an integrator or correlator C 41. Also, a filter may be included in coupler 22 or in receiver 40 to obtain the sideband modulation of signal of equations (15) and equations (16).

The gyrotron system of FIG. 3 can be used as an amplifier or as an oscillator. A gyrotron-amplifier may be inserted between a probe 20 and receiver 40 of a FIG. 2 or FIG. 4 system in which case the input field or signal to sidewall coupler 21 represents signal of equation (16), generally a low frequency signal, with or without a carrier signal, i.e., signal of equation (16) appears with its modulation as a low or high frequency. In either case, the amplified field or signal is obtained from output sidewall coupler 22. A gyrotron-oscillator operates as a stand-alone device in which case the output field or signal which appears at output sidewall coupler 22 as a low or high frequency, i.e., signal of equation (16) is generated internally with or without an input signal. In this case, input sidewall coupler 21 is not used or may be used to provide a field or signal other than signal of equation (16) to the gyrotron.

To understand how an amplification and power gain of the signal of equation (16) may be achieved in the system of FIG. 3, consider the gyrotron at a resonant frequency of 200 Hz in the conventional manner with heavy ions in beam 23. According to equation (8) these ions move at low speed even for the largest possible diameter gyrotrons. As in the more conventional case, ions provide energy to the field detected by sidewall coupler 22. While this is the well known action of a gyrotron amplifier or oscillator it is unconventional because it uses heavy ions in beam 23 and operates at a low frequency. In this sense it resembles more a cyclotron than it does a gyrotron.

Consider next the gyrotron operates at a resonant frequency of 1 GHz in the conventional manner with electrons in beam 23. According to equation (8) these electrons move at high speed and energy is provided to the field detected by sidewall coupler 22. This is the more conventional action of a gyrotron or oscillator. As stated previously, signal of equation (16) can be introduced into waveguide 20 through input sidewall coupler 21 as a modulation of the 1 GHz carrier frequency or it can be generated internally by providing heavy ions along with electrons in beam 23. In either case, energy is extracted from both ions and electrons and the field or signal detected in sidewall coupler 22 contains an amplified signal of equation (16).

Finally, consider the gyrotron operates at the gyrotron frequency of 1 GHz in the conventional manner with electrons in beam 23. Now, if electrons are made to move fast enough, relativistic effects take over. The 1 GHz cyclotron frequency of electrons will be detuned as the angular rate for electrons becomes $$\omega_e = \frac{e B_o}{m_e} \left(1 - \left(\frac{v_e}{c}\right)^2\right)^{\frac{1}{2}} = \frac{2\pi}{t_e} = \frac{v_e}{r_e} \quad (17)$$

which might purposely be made equal to the low cyclotron frequency of equation (8) of non-relativistic ions had these been used instead of electrons. In effect then, the energy of electrons appears at the low frequency of equation (17) so that the field or signal detected in sidewall coupler 22 no longer appears at the 1 GHz conventional carrier frequency but rather at the low frequency of equation (17) and which includes amplified signal of equation (16).

The foregoing examples illustrate the use of ions, ions and electrons, or electrons in beam 23. In the cases with ions or electrons, the field or signal detected by output coupler 22 is at low frequency of equation (8) or of equation (17) and the gyrotron physically assumes the form of a cyclotron device. In the case with ions and electrons, the field or signal detected by output coupler 22 is at high frequency of equation (17) with a low frequency of equation (8) modulation. In any case, energy transfers from a particle to its field at its cycltron frequency (8) or (17) and the amount of energy which transfers to a field and between fields is an obvious design choice for a gyrotron, cyclotron, or combined gyrotron-cyclotron device. It will be obvious therefore to specify a gyrotron or cyclotron to obtain amplification and power gain for a given application of the invention.

It will be appreciated that equation (16) is given by way of example and merely indicates but one suggestion how mass M will modulate the output wave of probe 20. More generally, the modulation due to M may include AM (amplitude modulation), FM (frequency modulation) and PM (phase modulation) of the original wave $e = E_c \sin \omega_c t$ (in the absence of M.). Also, artificial AM, FM and PM of the original wave may be provided by modulator 31 and such modulations may be detected by correlator C 41. In fact, modulator 31 may also modulator source 60, as shown by the dashed line in FIG. 2. For example, if modulator 31 chirps the transmitter 30 and source 60 synchronously in the FIG. 2 and FIG. 3 systems then correlator C 41 will detect the correlation between the chirps from receiver 40 and modulator 31. This chirping may be desired to increase the processing gain and thereby to enable the detection of extremely weak signals. In this example, the rate $\omega_c$ appearing in equation (16) is chirped.

It will also be appreciated that the angular direction of mass M (in the y-z plane) will be indicated by a phase term in equation (16). For example, the co-sinusoidal modulation of the $2\omega_o$ term equation (16) has 4 nulls (zeros) per cycle of the angular velocity $\omega_c$ (when M is present). Thus, the angular direction of mass M can be determined by correlating the 4 nulls observed per cycle with the 4 nulls of some reference relative to the orbital plane and probe 20. This means a correlator or integrator peak appearing at the output of correlator or integrator C 41 can be related to a reference and thereby for determining the angular direction of mass M. Accordingly, the timing of transmitter 30, modulator 31 and correlator C 41 can be calibrated to obtain the angular direction of mass M.

Thus, the angular bearing of mass M away from the z-axis in the y-z plane will be indicated by a phase change in equation (16). Since the cosinusoidal modulation in equation (16) has 4 nulls (zeros of the cosine term) per cycle (rotation) of mass m in orbit 19, when mass M is present, the angular bearing in the y-z plane can be determined by comparing or correlating the 4 nulls observed in the detected signal with the 4 nulls of a reference signal indicating a known bearing and thereby obtaining extremely accurate angular bearings of mass M in the y-z plane. It is expected therefore that angular bearings in the y-z plane will be limited not by the invention apparatus but rather by the stability of the platform which carries the invention apparatus. Accordingly, systems of the invention may be provided with stable platforms to thereby obtain extremely accurate angular bearings of mass M in the y-z plane.

The angular bearing of mass M away from the z-axis in the x-z plane will be indicated mainly by a reduction in the amplitude of the cosinusoidal term in equation (16), from a maximum along the z-axis to zero along the x-axis. The angular bearing measurement therefore in the x-z plane is crude at best. This problem can be solved by using an array of probes 20 with axes of individual probes placed along axes x, y, z respectively or by using a single probe 20 whose axis is placed in a direction equidistant from two or more coordinate axes x, y, and z.

Moreover, if the mass M is known then K-factor of equation (9) and signal of equation (16) can be calibrated as a function of range or if the range $r_o$ is known then K-factor of equation (9) and equation of equation (16) can be calibrated as a function of mass M. The calibration might be obtained using equation (9) for K or by actual calibration by placing a known mass M at known range $r_o$ recording the instrument reading and repeating this proceeedure for a number of ranges $r_o$ or masses M. This capability is useful in applications in which the invention system monitors objects of known mass whose range is unknown or objects at known range whose mass is unknown. Means may be provided therefore in receiver 40, correlator C 41, or scope 50 to indicate the range of a known mass or to indicate the mass of an object at known range. See my U.S. Pat. No. 3,896,435 entitled "Simple Radar" for a more detailed description how a radar system is calibrated. In my patent the governing equation is the well known radar equation while here the governing equation is the gravitational equation for K of equation (9). Either equation indicates the sensed wave (radar) or field (gravitational) varies inversely as a power of the range $r_o$ and as a direct function of the object cross section (radar) or mass M (gravitational). It will be obvious therefore how the invention system can be calibrated in applications requiring such calibration.

It will be appreciated that the resonant spectrometer system of FIG. 2 was chosen because it provides high Q-factor resonance gain and the gyrotron system of FIG. 3 was chosen because it provides high power gain. If a high resonance or power gain is not needed in a given application it will be obvious to select a system which provides the appropriate gain in a given application. For example, it will be obvious to provide probe 20 as a nuclear, atomic, ionic resonators, resonating cavity, or mechanical resonator or as a crossed or linear beam power tube such as a magnetron, amplitron, stabilotron, traveling wave tube, etc., for example as shown in the references cited previously.

FIG. 4 shows ions or electrons 23 constrained by a magnetic field $B_o$ 11 to move in a circular orbit 19 with a cyclotron frequency of equations (8) or of equations (17). Cyclotron resonance can be induced by exposing particles 23 to an oscillating electric field, such as that provided by a sine-wave signal generator 30 through an electrode, capacitor plate, or coil 21. As shown, electrodes 21 are the well known dees of a conventional cyclotron. When the frequency of the applied sine-wave signal is the same as the cyclotron frequency of particles 23, a resonance condition is established and the particle is steadily accelerated to a larger radius of gyration. This is the well known cyclotron effect and also provides the well known basis for mass spectroscopy because particles 23 having a different cyclotron frequency are not accelerated.

Most types of mass spectrometers detect ions 23 by causing them to collide with the surface of a device such as a continuous dynode electron multiplier 22. A multiplier 22 therefore may also be used to detect the strength of impinging particles 23. Multiplier 22 may take the form of an array of circular multipliers arranged thusly to sample different portions of orbit 19. Of course, any such arrangement will require a receiver 40 for each multiplier 22 or time sharing a single multiplier 22.

One type of mass spectrometer, the FT-MS spectrometer, is fundamentally different because it detects the image current 24 induced by the cyclotron motion of ions 23 in orbits 19 located between electrodes, capacitor plates, or coils 22. The FT-MS spectrometer has been more fully described in the article by W. Bowers et al., "FT-MS uses image current detector to get high mass resolution" appearing in the Nov. 1983 issue of Industrial Research and Development magazine.

In FIG. 4, a packet of particles 23 undergoes coherent cyclotron motion between two electrodes 22 that are connected to a grounded resistor R 25. As the particles 23 move in orbit 19, the flow of electrons in the external circuit creates an image current I 24 that has the same frequency as the cyclotron frequency of particles 23.

In the absence of mass M, the signal which appears across resistor R 25 is a sine-wave, namely, signal of equation (16) without frequency or amplitude modulation. This signal can be amplified and readily detected in receiver 40. In the presence of mass M, the signal which appears across resistor R 25 is a modulated sine-wave, for example signal of equation (16) with amplitude modulation. This signal too can be amplified and readily detected in receiver (40) to obtain the modulation and thereby to detect the presence of mass M. In FIG. 4, mass M (not shown) is located at distance $r_o$ along the negative z-axis.

If cyclotron resonance is induced, using a transmitter 30, the radius of orbit 19 and the amplitude of current I 24 will start increasing but the cyclotron frequency $\omega_c$ remains unchanged. Unless prevented from doing so, particles 23 will eventually collide with electrodes 22, as in most types of conventional spectrometers. If the applied electric field is removed before particles 23 collide with electrodes 22, the radius of orbit 19 and the amplitude of current I 24 will decay back to their non-resonant levels. The invention may utilize orbits 19 with fixed or changing radius the former being preferred over the latter. And, the invention may utilize orbits 19 with or without inducing resonance, i.e., with or without transmitter 30. Of course, having resonance provides for a resonance gain and more readily separates frequencies in orbits 19. In this last regard it should be noted that when transmitter 30 illuminates orbit 19, through electrodes 21, with a modulated field it will, in effect, separate all frequencies in orbit 19 which are also contained in the modulation. Of course, energy transfers from the particle 23 to the field established by electrodes 21 occurs when particle and field are in-phase synchronism and, energy transfers from the field to the particle when these are out-of-phase, at the fundamental or at a harmonic frequency.

In the presence of mass M, the modulation term in equation (16) also appears in current I 24 or is indicated in current I 24 in one of a number of ways depending from the type of modulation used to modulate field $B_o$ 11, transmitter 30, and source 60. More about this will be said later.

The signal-to-noise ratio at the output of probe 20 is $$\frac{S}{N} = \frac{3K}{2\omega_o^2} \frac{S_i}{N_i} G_p, \quad G_p = G_1 G_2 G_3 G_4 \tag{18}$$

where $K = \dfrac{GM}{r_o^2}$, $\omega_o = 2\pi f_o$; $f_o$ = frequency $S_i$ = power input to probe 20

$N_i$ = noise power of probe 20; $N_i = kTBF$ $kT = 4 \times 10^{-21} w\ s$ $B$ = bandwidth of probe 20

$F$ = noise figure of probe 20

$G_p$ = total system gain $G_1$ = resonance gain; by operating probe 20 at the Larmor or cyclotron frequency $G_2$ = power gain; by operating probe 20 at maximum power $G_3$ = temperature gain; by operating probe 20 at low temperature -continued
$G_4$ = processing gain; by matched filtering or correlating signals It will be appreciated that the term $S_i/N_i$ in equation (18) is the output signal-to-noise ratio of a conventional FIG. 2, FIG. 3, or FIG. 4 gainless ($G_p = 1$) system. In the system of the invention, equation (18) is the output signal-to-noise ratio of the modulation which occurs in equation (16). Thus, if $S_i$ is the minimum power input to a conventional FIG. 2, FIG. 3, or FIG. 4 system, the invention feasibility for a desired K-factor sensitivity is assured when the product of all terms except $S_i/N_i$ is greater or equals unity and this condition specifies the maximum invention frequency $$f_o = \frac{1}{2\pi} \left( \frac{3}{2} K G_p \right)^{\frac{1}{2}} \quad (19)$$

which is remarkable because it implies any desired sensitivity can be obtained provided orbit frequency $f_o$ does not exceed the value of equation (19).

In the submarine example, the gainless sensitivity ($G_p = 1$) $K = 6.67 \times 10^{-7}$ EU limits the orbital frequency not to exceed $5 \times 10^{-9}$/s which clearly is impossible. However, if the system provides a gain product of 200 $G_p = 10^{20}$, the maximum orbital frequency becomes 50/s. Gain product $G_p$ may be achieved using any combination of its product terms, for example using $G_1 = 10^9$, $G_2 = 10^6$, $G_3 = 10^2$, $G_4 = 10^3$ such selections representing presently available performance of conventional devices. Of course, a tenfold decrease in the range $r_o$, from 10 km to 1 km, would increase K by a factor $10^6$ and this would increase the maximum orbital frequency to 50 kHz.

In the small mass example, the gainless sensitivity ($G_p = 1$) $K = 6.67 \times 10^{-2}$ EU limits the orbital frequency not to exceed $1.593 \times 10^{-6}$/s which again clearly is impossible. However, if the system provides a gain product $G_p = 10^{16}$, the maximum orbital frequency becomes 159.3/s. Gain product $G_p$ may be achieved using any combination of its product terms, for example using $G_1 = 10^8$ $G_2 = 10^4$, $G_2 = 10^2$, $G_4 = 10^2$ such selections representing presently available performance of conventional devices.

In the foregoing two examples, the gainless sensitivity ($G_p = 1$) varies between $K = 6.67 \times 10^{-2}$ EU for a 1 kg object at 1 m range to $K = 6.67 \times 10^{-7}$ EU for a 10,000 ton submarine at 10 km range. These examples indicate that a gain product $G_p$ of between 16 and 20 orders of magnitude will be required to implement the invention system in many applications. It will be appreciated therefore that one or more of gains $G_1$, $G_2$, $G_3$, $G_4$ may or may not be used in a given application. Moreover, since resonance gain $G_1$ may be needed, a resonant device based on the Larmor or cyclotron frequency is indicated. Since power gain $G_2$ may be needed, a gyrotron or cyclotron device is indicated. Since temperature gain $G_3$ may be needed, a cooling system is indicated. And, since processing gain $G_4$ may be needed, a modulator transmitter and demodulator receiver is indicated. Finally, since orbital frequency of equation (19) falls short of Larmor and cyclotron frequencies for the lighter particles, equation (7) indicates operation at low g-factor, low charge-to-mass ratio, and low magnetic field, consistent with operating a spectrometer, gyrotron, or cyclotron device. For example, the cyclotron frequency of a proton 23 at a field strength of $B_o = 1$ Tesla (10,000 Gauss) is 42.57 MHz which drops to 42.57 KHz at the lower field strength of $10^{-3}$ Tesla. A heavy ion having about 200 times less the proton mass will have a frequency of about 200 Hz at a field strength of $10^{-3}$ Tesla. It will be appreciated therefore that, in many applications, the invention may require use of heavy ions at low field strength $B_o$.

Equation (8) indicates that a system with a maximum radius of $r = 0.5$ m and which operates at a cyclotron frequency of $f_c = 200$ Hz provides ions 23 at a maximum non-relativistic speed of about 600 m/s. This of course limits the amplification and power gain which can be achieved by increasing the speed in a conventional manner. However, since the particle energy is given by $\frac{1}{2} m v^2$, the amplification and power gain can be increased by increasing the mass m of a particle and by providing a large number of particles in beam 23. Or, as suggested previously in connection with the discussion of equation (17), the amplification and gain can be increased by using relativistic particles in beam 23.

In view of equation (7), it might be expected that equation (15) would make for a periodic lack of resonance at frequencies other than $f_c$. In other words, the tidal modulation will detune the cyclotron frequency of equation (7). This effect can be used in several ways to detect the modulation due to the presence of mass M. For example, it is apparent from equation (7) that if the strength of field $B_o$ 11 changes in synchronism with rate of equation (15) the resonance is maintained at the same cyclotron frequency and this would indicate the presence of modulation due to mass M. In another example, if transmitter 30 provides a field that changes in synchronism with rate of equation (15) the resonance is maintained over a band of cyclotron frequencies and this would indicate the presence of modulation due to mass M. In yet another example, the effect of detuning from resonance can be observed itself in receiver 40 and this would indicate the presence of modulation due to mass M. Each of the foregoing cases requires the detection and correlation of a unique signal due to the tidal action of mass M on instrument mass m in probe 20. Since this unique signal is endlessly repetitive with identical segments of period $t_c$ of equation (8) these segments can be integrated over long observation periods $T_o$ to obtain almost limitless processing gains $G_4$. This technique will be particularly useful in astronomical applications of the invention.

From the foregoing it will be appreciated that the system of the invention is based on the cyclotron principle of the interaction of a field and matter to produce a resonance and power gains. The field may be magnetic, electric, electromagnetic, acoustic, or mechanical, the cases in FIGS. 2–4 being given by way of example. The matter may comprise bound or unbound electrons, protons, ions, levitating mass, the samples and plasmas of FIGS. 2–4 being given by way of example. Thus, in FIG. 2 the example interaction is between the magnetic field established by coil 21 and bound or unbound particles of a sample or plasma. In FIG. 3, the example interaction is between a beam of unbound particles and an electromagnetic wave. In FIG. 4, the example interaction is between an electric field established by electrodes or plates 21 and bound or unbound particles of a sample or plasma. Resonance gain is obtained by making the field frequency equal the sample or plasma cyclotron frequency. Power gain is obtained by effecting energy transfers between particles and their fields.

The invention apparatus therefore postulates a probe means 20 which includes an imposed or inherent field or wave (magnetic, electric, electromagnetic, acoustical, mechanical) interacting with a bound or unbound charged mass means (nuclear, atomic, ionic, mechanical), said probe 20 including coupling means 21, 22 for coupling the field or wave from a transmitter 30 and to a receiver 40, said transmitter 30 optionally for providing a field or wave to the probe 20, and said receiver 40 for pre- or post- detecting the field or wave from probe 20, said field or wave from probe 20 including or representing signals due to the presence of mass M. The transmitter 30 may use AM, FM or PM modulator 31 to modulate transmitter 30 and the receiver 40 may use a filter, integrator or correlator C 41 to process signals and thereby to obtain processing as well as resonance and amplification gains provided by probe 20. A magnetic, electric, electromagnetic acoustic, or mechanical field $B_o$ 11 used to constrain particles 23 may use AM, FM, or PM signals to modulate field $B_o$ 11. Directional finding means may be included to obtain the angular direction of mass M and, a scope 50 may be used to view and record events.

The invention method is equally uncomplicated and comprises the steps of interacting an imposed or inherent field or wave (magnetic, electric, electromagnetic, acoustical, mechanical) with bound or unbound charged mass means (nuclear atomic, ionic, mechanical) in a probe 20, providing coupling means 21, 22 in said probe 20 for coupling the field or wave from a transmitter 30 and to a receiver 40 said transmitter 30 optionally for providing a field or wave to the probe 20 and said receiver for pre- or post- detecting the field or wave from probe 20, said field or wave from probe 20 including or representing signals due to the presence of mass M. The method may include the additional steps of modulating transmitter 30 and filtering, integrating and correlating signals from receiver 40, finding the angular direction of mass M, and viewing and recording events. The method may include the step of using a magnetic, electric, electromagnetic, acoustic, or mechanical field $B_o$ 11 to constrain particles 23 and may include the step of using AM, FM, or PM signals to modulate field $B_o$ 11.

In many applications it is desired to detect the presence of a mass, for example to find ore deposits, ships, submarines, tanks and artillery under brush cover, and even small metallic objects such as handguns at airport terminals. The present mass detectors are based on electromagnetic, acoustic and magnetic detection since these are relatively easy and economical to build but, none are based on gravitational detection since these are difficult and costly to build and at best have limited sensitivity. For example, see the metal detectors in the articles by B. Walsh "Sub Detection" appearing in the Apr. 1976 issue of Countermeasures, by L. Optiz "Metal detecting radar" appearing in the Aug. 1976 issue of Microwaves, "No Place to Hide" appearing in the Dec. 1975/Jan. 1976 issue of Countermeasures, and by R. Lee "Metal Detection System" NASA Tech Brief 70-10511 Nov. 1970. While some gradiometers, for example the Hughes, Bell and Draper Labs gradiometers, are now beginning to appear these systems lack the necessary sensitivity to provide long detection range for other than the simpler applications. In contrast, the gravitational mass detector of the invention offers apparatus and method to make the oceans and ground covers transparent to great depths in the most important applications envisaged. The all weather penetrating capability of the invention compared to electromagnetic detection systems is obvious. The impact therefore of the invention system on the defense establishments of many nations will be substantial since they can no longer hide their principal weapons on the ground, in the seas, and in space, from the general view. Since such weapons are justified at the social cost of huge taxations of citizens in the name of defense, for once, there is now no excuse to build these weapons if they can be seen by a simple instrument. Such then is the expected impact of the gravitational mass detection system of the invention.

Although a number of particular configurations of the invention system mass detector have been described, it should be understood that the scope of the invention should not be limited by the particular embodiments of the invention shown by way of illustration but rather by the appendant claims.

I claim:

1. In a system for detecting at a point P the gravitational field of a mass M located at another point Q at a distance from point P, including in combination:

means for constraining at least one mass m to rotational motion in a path about point P, with the mass m at or near the point P so that the distance between point P and the mass m is small compared to the distance between points P and Q;

said means for constraining being provided by one of a magnetic, electric, electromagnetic and acoustic force acting on mass m and connecting mass m to point P where mass m is a natural mass distinct from a man made mass, and said path being located for maximum response in a plane which contains known tidal forces of mass M; and means for detecting a signal produced by variations along said path of mass m which variations are produced by tidal forces created by the gravitational field of mass M acting on mass m, which signal includes desired information about mass M.

2. The system of claim 1 including means for illuminating said mass m with energy.

3. The system of claim 2 wherein said means for illuminating includes one of a magnetic, electric, electromagnetic, acoustic and mechanical field.

4. The system of claim 2 wherein said means for illuminating includes one of an electrode, condenser plate, coil and sidewall coupler.

5. The system of claim 2 wherein said means for illuminating includes one of a transmitter, and a transmitter and a modulator for modulating said transmitter.

6. The system of claim 5 wherein the frequency of said modulator changes in synchronism with the magnetic moment or motion of said mass m.

7. The system of claim 1 wherein said means for constraining includes one of magnetic, electric, electromagnetic, acoustic and mechanical fields.

8. The system of claim 1 wherein said means for constraining includes one of an electrode, condenser plate, coil and magnet.

9. The system of claim 1 wherein said means for constraining includes one of a transmitter, and a transmitter and a modulator for modulating said transmitter.

10. The system of claim 9 wherein the frequency of said modulator changes in synchronism with the magnetic moment or motion of said mass m.

11. The system of claim 1 wherein said means for constraining includes source means for providing said mass m.

12. The system of claim 11 wherein said source means includes a modulator for modulating the output of said source means.

13. The system of claim 12 wherein said source means provides one of a continuous and pulsed beam of said mass m.

14. The system of claim 13 wherein said source means provides a plurality of different types of masses m.

15. The system of claim 13 wherein said source means provides a plurality of different charges of masses m.

16. The system of claim 13 wherein said source means provides relativistic mass m.

17. The system of claim 1 wherein said mass m is one of a bound and unbound mass m.

18. The system of claim 1 wherein said mass m is one of a wave energy mass m.

19. The system of claim 1 wherein said mass m is a charged mass.

20. The system of claim 1 wherein said mass m is one of an electron, nucleon, atomic, ionic and mechanical mass m.

21. The system of claim 1 wherein said mass m is a relativistic mass m.

22. The system of claim 1 wherein the magnetic moment of said mass m is characterized by a Larmor or cyclotron frequency.

23. The system of claim 1 wherein said path is a circular path.

24. The system of claim 1 wherein said motion in a path is one of a spinning mass m centered at point P and of an orbiting mass m with orbit centered at point P.

25. The system of claim 1 wherein said means for detecting includes one of a magnetic, electric and electromagnetic field.

26. The system of claim 1 wherein said means for detecting includes one of an electrode, condenser plate, coil and sidewall coupler.

27. The system of claim 1 wherein said means for detecting includes means for obtaining one of the angular direction, range and mass of said mass M.

28. The system of claim 1 wherein said means for detecting includes means calibrated to obtain one of the range and mass of said mass M.

29. The system of claim 1 wherein said means for detecting detects one of the magnetic moment and motion of said mass m.

30. The system of claim 1 wherein said means for detecting includes a plurality of spatially separated detecting means.

31. The system of claim 1 wherein said information about mass M is due to the action of its tidal field on said path of mass m.

32. The system of claim 1 wherein said information about mass M is available as one of a fixed function of time and of a varying function of time.

33. The system of claim 1 wherein said information about mass M is available as one of an amplitude, frequency, and phase modulation of said signal produced by said mass m.

34. The system of claim 1 wherein said means for constraining and means for detecting form part of an amplifier or oscillator.

35. The system of claim 1 wherein said means for constraining and means for detecting form part of one of a magnetic resonance spectrometer, gyrotron, cyclotron, ion spectrometer and Fourier Transform mass spectrometer.

36. The system of claim 1 including means for providing one of a resonance, power, temperature, and processing gains of said signal produced by said mass m.

37. The system of claim 1 wherein said means for constraining is provided by a magnet or electromagnet, and said means for detecting includes a probe having transmit and receive coils, a transmitter connected to said transmit coil which supplies a magnetic or electromagnetic field, a sample or plasma of mass m, and a receiver connected to said receive coil which detects said field produced by said mass m at the resonating frequency of the magnetic moment of said mass m.

38. The system of claim 1 wherein said means for constraining is provided by a magnet or electromagnet, and said means for detecting includes a waveguide probe having transmit and receive sidewall couplings, a transmitter connected to said transmit sidewall coupling which supplies a magnetic or electromagnetic field, a source which supplies mass m in a beam to said waveguide probe, and a receiver connected to said receive sidewall coupling which detects said fields produced by said mass m at the resonating frequency of the magnetic moment of said mass m.

39. The system of claim 1 wherein said means for constraining is provided by a magnet or electromagnet, and said means for detecting includes a probe having transmit and receive electrodes, a transmitter connected to said transmit electrode which supplies an electric or electromagnetic fields, a source which supplies mass m in a beam to said probe, and a receiver connected to said receive electrode which detects said field produced by said charged mass m at the resonating frequency of the magnetic moment of said mass m.

40. In a system for detecting at a point P the gravitational field of a mass M located at another point Q at a distance from point P, including in combination:
    means for constraining at least one charged mass m to rotational motion in a path about point P, with the mass m at or near point P so that the distance between point P and the mass m is small compared to the distance between points P and Q;
    said means for constraining being provided by one of a magnetic, electric, electromagnetic and acoustic force acting on mass m and connecting mass m to point P and said path being located for maximum response in a plane which contains known tidal forces of mass M; and
    means for detecting a signal produced by variations along said path of said charged mass m which variations are produced by tidal forces created by the gravitational field of mass M acting on charged mass m, which signal includes desired information about mass M.

41. The system of claim 40 including a modulator for modulating one of said constraining means, transmitter and source.

42. The system of claim 40 including a modulator for modulating one of said constraining means, transmitter and source in frequency synchronism with the magnetic moment or motion of said mass m.

43. The system of claim 40 wherein said said probe, waveguide or source provides relativistic mass m.

44. The system of claim 40 wherein the magnetic moment of said mass m is characterized by a Larmor or cyclotron frequency.

45. The system of claim 40 wherein said means for detecting detects one of magnetic moment and motion of said mass m.

46. The system of claim 40 wherein said means for detecting detects said information about mass M at one of audio and radiofrequency.

47. The system of claim 40 wherein said information about mass M is available as one of amplitude, frequency and phase modulation of said signal produced by said mass m.

48. A method for detecting at a point P the gravitational field of a mass M located at another point Q at a distance from point P, including the steps of:
- constraining at least one mass m to rotation in a path about point P, with the mass m at or near the point P so that the distance between point P and the mass m is small compared to the distance between points P and Q;
- using a natural mass distinct from a man made mass;
- directing one of a magnetic, electric, electromagnetic and acoustic force to act on mass m and connect mass m to point P;
- locating said path for maximum response in a plane which contains the known tidal forces of mass M; and
- detecting a signal produced by variations along said path of mass m which variations are produced by tidal forces created by the gravitational field of mass M acting on mass m, which signal includes desired information about mass M.

49. A method of claim 48 including the step of using a charged mass.

50. The method of claim 48 including the step of using the action of the tidal field of said mass M on said path of mass m to obtain said signal and information about mass M.

51. The system of claim 1 wherein said signal includes a fixed frequency.

52. The system of claim 1 wherein said signal includes a sinusoidal frequency.

53. The system of claim 1 wherein said points P and Q are at a fixed distance.

54. The system of claim 1 wherein said points P and Q are in relative motion.

55. The system of claim 1 wherein said variations are at least one of radial, angular, radial rate, angular rate, radial acceleration, and angular acceleration variations.

56. The system of claim 1 wherein said tidal forces are predicted by Newton's force of gravitation.

57. The system of claim 1 wherein said means for detecting includes one of a probe and waveguide having transmit and receive elements, a transmitter connected to said transmit element which supplies a magnetic, electric, electromagnetic or acoustic field, a source which supplies mass m to said probe or waveguide, and a receiver connected to said receive element which detects said signal at the resonating frequency of said mass M.

58. The system of claim 1 wherein said mass M is a gravitationally non-radiating mass.

59. The system of claim 1 wherein said mass M is a gravitationally radiating mass.

60. The system of claim 1 wherein said means for constraining constrains a single mass m.

61. The method of claim 48 including the step of using a fixed distance between points P and Q.

62. The method of claim 48 including the step of using relative motion between points P and Q.

63. The method of claim 48 including using at least one of radial, angular, radial rate, angular rate, radial acceleration, and angular acceleration variations of said path in said signal detecting step.

64. The method of claim 48 including the step of using Newton's force of gravitation to predict said tidal forces.

65. The method of claim 48 including the step of constraining a single mass m.

* * * * *